VOLTAGE AMPLITUDE-TO-TIME DURATION CONVERTER

Filed May 22, 1967 2 Sheets-Sheet 1

INVENTOR
J. L. ABERNATHY
BY [signature]
ATTORNEY

Nov. 18, 1969 J. L. ABERNATHY 3,479,604

VOLTAGE AMPLITUDE-TO-TIME DURATION CONVERTER

Filed May 22, 1967 2 Sheets-Sheet 2

3,479,604

VOLTAGE AMPLITUDE-TO-TIME DURATION CONVERTER

John L. Abernathy, Orlando, Fla., assignor to Bell Telephone Laboratories, Incorporated, Murray Hill, N.J., a corporation of New York Filed May 22, 1967, Ser. No. 640,199
Int. Cl. H03k 17/02
U.S. Cl. 328—151 4 Claims

ABSTRACT OF THE DISCLOSURE

A first nonlinear circuit is charged by an input voltage. Gating circuitry causes the first nonlinear circuit to begin to discharge and a second nonlinear circuit to begin to charge from a reference source. A comparator produces an output pulse when the output levels of the two nonlinear circuits are equal to one another. The time of occurrence of the output pulse is linearly related to the amplitude of the input voltage.

BACKGROUND OF THE INVENTION

Field of the invention

This invention relates to voltage amplitude-to-time duration converters.

Description of the prior art

The common approach to convert from voltage amplitude to time duration is through the use of a ramp generator. In order to achieve linear conversion, such a generator may include a constant current source for charging a capacitor. This technique, of course, requires a constant current source which may not always be available or economically feasible. An alternative technique is to use a non-constant current source and to limit the output of the generator to a portion of the exponential voltage change across the capacitor. This has the disadvantage of producing a relatively small, somewhat nonlinear output voltage change which adversely affects the desired conversion.

SUMMARY OF THE INVENTION

An object of the invention is to linearily convert voltage amplitude to time duration without the use of a constant current source.

This and other objects are achieved by the invention by first permitting an input voltage to charge a nonlinear circuit. Gating circuits are then disabled to cause the nonlinear circuit to begin to discharge and, furthermore, to cause a second nonlinear circuit to charge from a reference voltage source. When the outputs from the two nonlinear circuits are equal to one another, a comparator produces an output. As explained in detail in the following discussion, the nonlinear natures of these two circuits are chosen so that the occurrence of the comparator output with respect to the disabling of the gating circuits is substantially linearly related to the amplitude of the input voltage.

DESCRIPTION OF THE DISCLOSED EMBODIMENT

Figures 1, 1A:
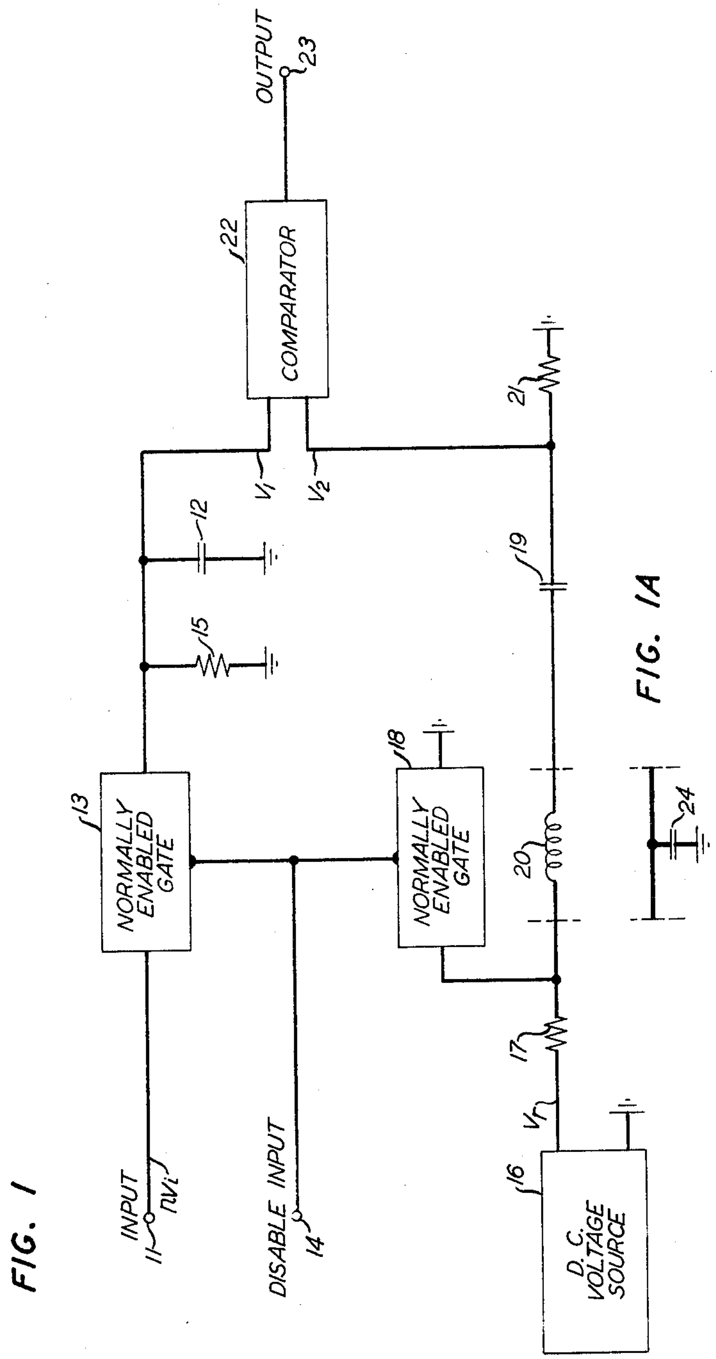
FIG. 1 is a diagram of a circuit embodying the invention.
FIG. 1A shows a partial circuit for modifying the circuit of FIG. 1.

The embodiment of the invention shown in FIG. 1 includes an input terminal 11. A voltage applied to this terminal charges a capacitor 12 by way of a normally enabled gate 13. When gate 13 is disabled in response to a disabling voltage applied to a terminal 14, the charge in capacitor 12 is dissipated by way of a shunting resistor 15. The waveform of the capacitor voltage while the capacitor is discharging is, of course, of an exponential nature.

Figure 2:
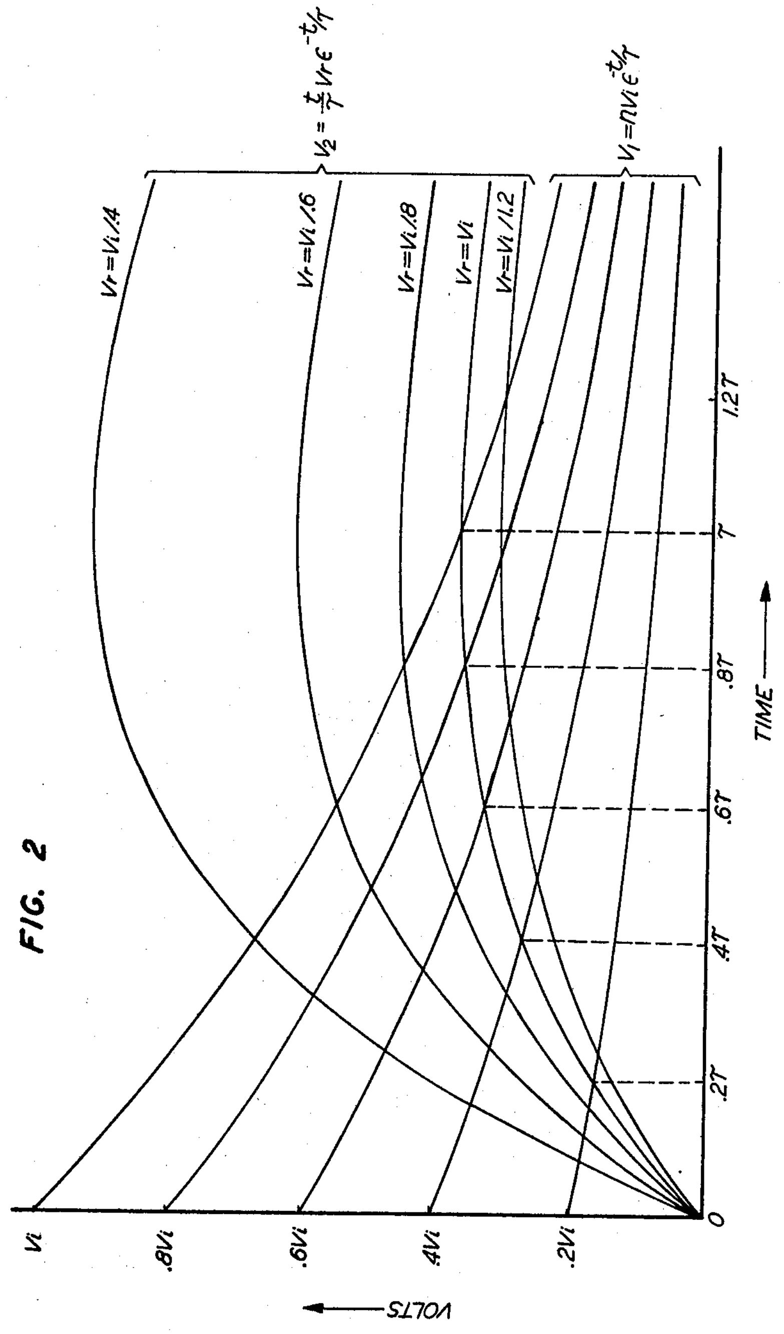
FIG. 2 is a set of curves used in the explanation of the operation of the circuit of FIG. 1.

FIG. 2 shows a family of exponential curves representing the capacitor voltages for various values of input voltages. The general expression for these curves is:

$$v_1 = nv_i\epsilon^{-t/\tau}$$

where $v_1$=capacitor voltage,
$v_i$=maximum input voltage
$n$=any number between zero and one so that actual input voltage is $nv_i$,
$t$=expired time after disabling, and
$\tau$=the time constant of the resistor-capacitor combination.

The combination shown in FIG. 1 also includes a direct current voltage source 16 that produces a voltage $v_r$. A resistor 17 is connected between source 16 and a normally enabled gate 18. In its enabled state, gate 18 connects resistor 17 to ground. Resistor 17 is also connected to ground by way of a series combination comprising a capacitor 19, an inductor 20 and a resistor 21. When gate 18 is disabled by a disabling voltage from terminal 14, a voltage is developed across resistor 21. The general expression for this voltage is:

$$v_2 = \frac{t}{\tau} v_r \epsilon^{-t/\tau}$$

where $t$=expired time after disabling,
$v_r$=the voltage from source 16, and
$\tau$=the time constant of the circuit comprising capacitor 19 and inductor 20 (i.e., $\tau$=the product of capacitance and inductance).

A family of curves respresenting $v_2$ for several values of $v_r$ is also shown in FIG. 2.

Several things should be noted about the curves of FIG. 2. First consider the points where the $v_2$ curves cross the $v_1 = v_i\epsilon^{-t/\tau}$ curve. It will be noted that for $v_r = v_i/x$, the time of crossing is $x\tau$ (where $x$ is any number and appears in the drawings as 1.2, 1.0, .8, .6, .4). In other words, there is an inverse relationship between the level of $v_r$ and the time of crossing.

The second thing to note about these curves is best understood by considering the points where the $v_2$ curve for $v_r = v_i$ crosses the $v_1$ curves. It will be noted that for $nv_i$ input, the time of crossing is $n\tau$; that is, there is a linear relationship between input voltage level and the time of crossing. As shown in FIG. 2, this linear relationship holds true for other values of $v_r$.

Advantage is taken of this linear relationship by applying voltages $v_1$ and $v_2$ to a comparator 22 (see FIG. 1). Comparator 22 is conventional in design and produces an output pulse at a terminal 23 when the voltages $v_1$ and $v_2$ are equal one to the other. For a given set of components and voltage $v_r$, the interval between the leading edge of the disabling voltage applied to terminal 14 and the pulse appearing on terminal 23 is directly related to the amplitude of the voltage applied to terminal 11.

The following discussion explains the relationship of the $v_2$ family of curves and the circuitry for producing them, and the selection of component values for this circuitry.

The Laplace transformation of $$v_2=\frac{t}{\tau}v_r\epsilon^{-t/\tau}$$

is $$V(s)=v_r\frac{\tau}{(1+\tau s)^2}$$

As V($s$) is to be produced by a step voltage (the disabling of gate 18) applied to a network, the Laplace expression for the network transfer characteristic is:

$$G(s)=\frac{\tau s}{(1+\tau s)^2}$$

The Laplace transformation expression for the network comprising resistors 17 and 21, capacitor 19 and inductor 20 of FIG. 1 is:

$$G(s)_1=\frac{R_{21}Cs}{1+(R_{17}+R_{21})Cs+LCs^2}$$

When these components are chosen so that $$R_{21}C=R_{17}C=\sqrt{LC}=\tau$$

then $$G(s)_1=\frac{\tau s}{(1+\tau s)^2}$$

which is identical to G($s$). The circuitry involving resistors 17 and 21, capacitor 19 and inductor 20 therefore produces the $v_2$ curves of FIG. 2 when the values of these components are chosen as stated above.

It may not always be practical to choose $R_{17}$ equal to $R_{21}$. When this cannot be done, the values of these two resistors should be selected so that $(R_{17}+R_{21})C=2\tau$. This relationship will keep the denominator of $G(s)_1$ unchanged while causing a constant to appear in its numerator. Compensation for this constant is achieved by changing the value of $v_r$, as appreciated by referring back to the equation for V($s$).

The circuit thus far described produces, within circuit element tolerances, a true linear conversion.

In some applications, such as those using thin film circuitry, it is not possible or practical to provide inductor 20. When this occurs, the circuit may be modified by replacing inductor 20 with the partial circuit shown in FIG. 1A. This modification in effect replaces inductor 20 with a through circuit connection and, furthermore, connects capacitor 24 between this connection and ground. The linear conversion provided by the first-described circuit would be achieved in the modified circuit if the high-pass L-section comprising capacitor 19 and resistor 21 did not present any loading to the low-pass L-section comprising capacitor 24 and resistor 1. In practice, the second L-section always presents some loading. The extent of the loading will, of course, determine the degree of deviation from a true linear conversion. In many applications, the derivation provided by the modified circuit is acceptable.

Although only one embodiment and a modification thereof have been disclosed and described in detail, various other embodiments may be devised without departing from the spirit and scope of the invention.

What is claimed is:

1. In combination, first means having a time constant $\tau$ and which, when activated, produces an output voltage substantially equal to $v\epsilon^{-t/\tau}$, where $v$ equals an input voltage prior to activating and $t$ is expired time after activating, second means having a time constant $\tau$ and which, when activated, produces an output voltage substantially equal to $$\frac{t}{\tau}v_r\epsilon^{-t/\tau}$$

where $v_r$ is a constant voltage and $t$ is expired time after activating, means to simultaneously activate said first and second means and means to produce an output when said first and second means output voltages are equal to one another.

2. In combination, a first nonlinear circuit having a time constant $\tau$ and which, when discharging, produces an output voltage substantially equal to $v\epsilon^{-t/\tau}$, where $v$ equals an input voltage prior to discharging and $t$ is expired discharging time, a second nonlinear circuit having a time constant $\tau$ and which produces in response to an input voltage $v_r$, an output voltage substantially equal to $$\frac{t}{\tau}v_r\epsilon^{-t/\tau}$$

means to simultaneously start the discharging of said first circuit and apply said voltage $v_r$ to said second circuit, and means to produce an output when said first and second circuit output voltages are equal to one another.

3. In combination, an input terminal, a first combination comprising a parallel-connected resistor-capacitor circuit having a time constant $\tau$ and normally connected to said input terminal, first means, when activated, disconnects said combination from said input terminal, a series-connected combination comprising a pair of resistors, a capacitor and an inductor where the product of the inductance of said inductor and the capacitance of said capacitor substantially equals $\tau^2$ and the product of the sum of the resistances of said resistors and the capacitance of said capacitor equals $2\tau$, second means to simultaneously activate said first means and apply a reference voltage to said series-connected combination, and third means to produce an output when the voltage across said first combination and the voltage across one of said resistors in said series-connected combination are equal to one another.

4. In combination, an input terminal, a first combination comprising a parallel-connected resistor-capacitor circuit having a time constant $\tau$ and normally connected to said input terminal, first means, when activated, disconnects said combination from said input terminal, a second combination comprising a low-pass resistor-capacitor L-section and a high-pass resistor-capacitor L-section connected in series in that order and each having a time constant of $\tau$, second means to simultaneously activate said first means and apply a reference voltage to said low-pass L-section, and third means to produce an output when the voltage across said first combination and the voltage across the resistor of said high-pass L-section of said second combination are equal to one another.

References Cited

UNITED STATES PATENTS

| | | | |
|---|---|---|---|
| 3,032,714 | 5/1962 | Cohen | 307—293 XR |
| 3,105,939 | 10/1963 | Onno et al. | 328—146 XR |
| 3,179,882 | 4/1965 | LeClear | 328—127 XR |

DONALD D. FORRER, Primary Examiner

JOHN ZAWORSKY, Assistant Examiner

U.S. Cl. X.R.

307—232,235,243; 328—147, 154